G. J. CAPEWELL.
Machine for Manufacturing Horseshoe-Nails.
No. 217,336. Patented July 8, 1879.
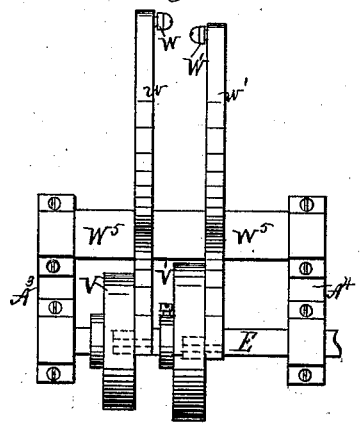
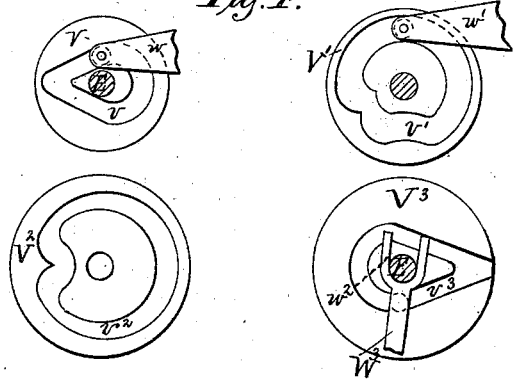
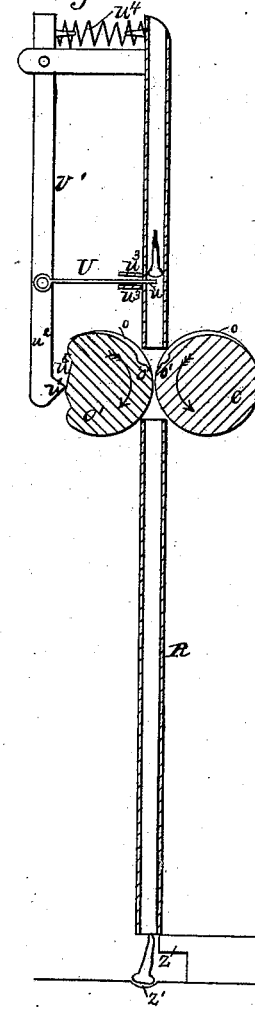
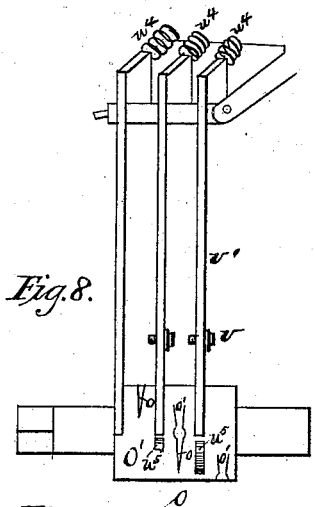
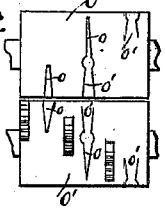
Witnesses:
Frank W. Burnham
Arthur L. McIntire
Inventor:
George J. Capewell
by
W. H. Babcock
Attorney.

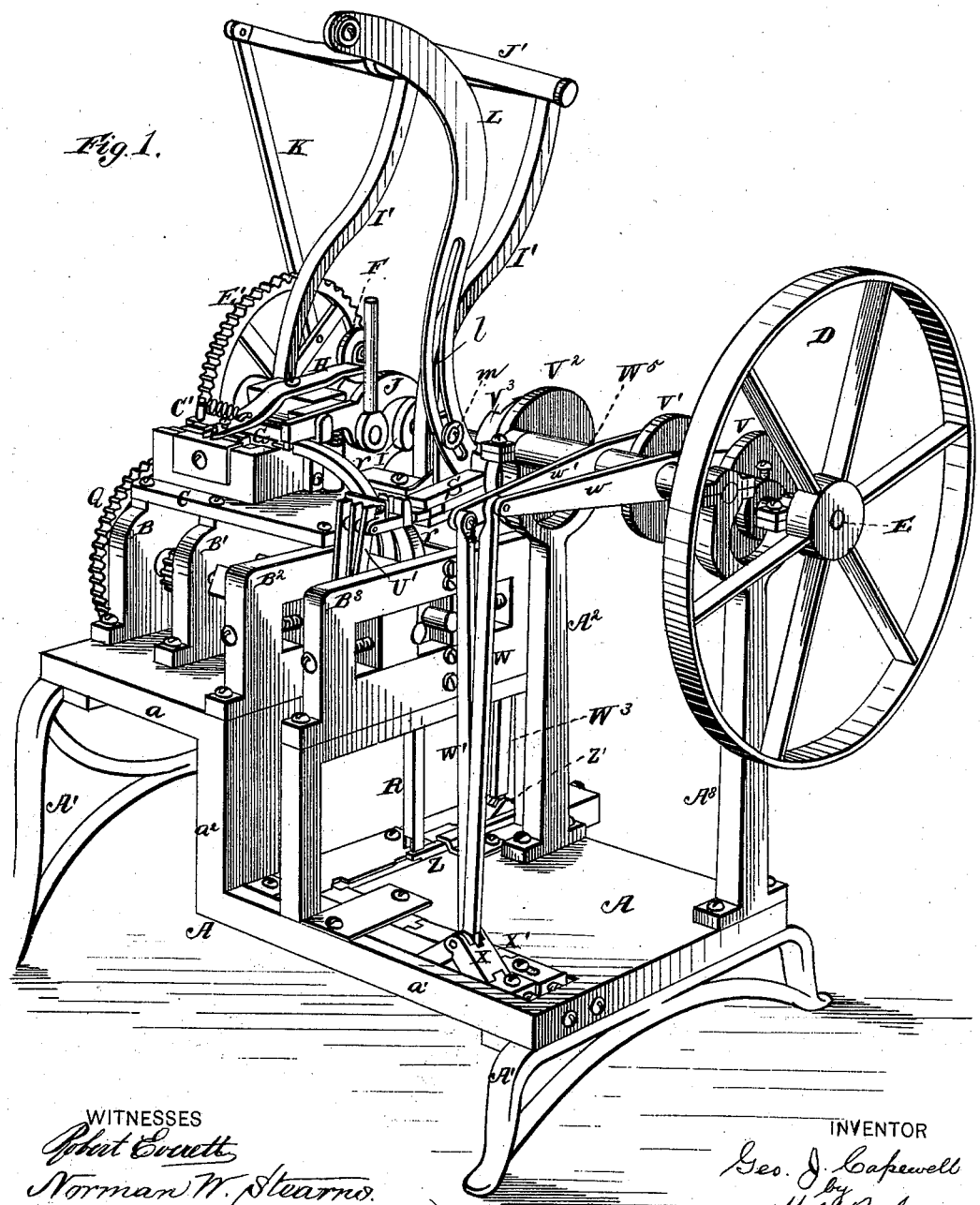

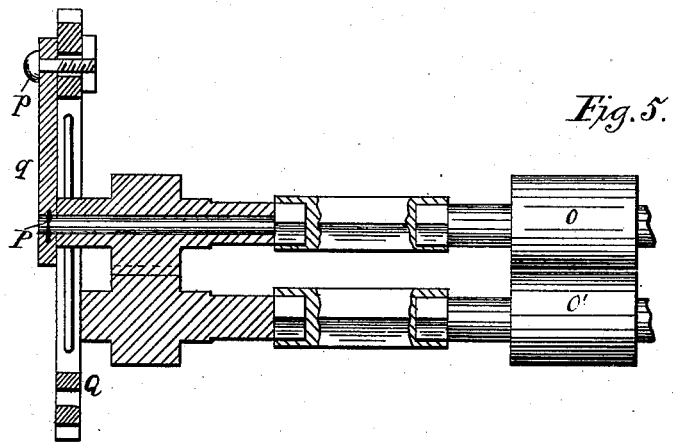
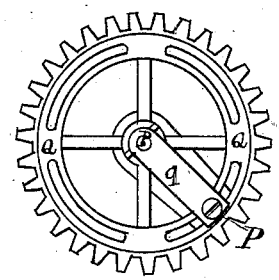
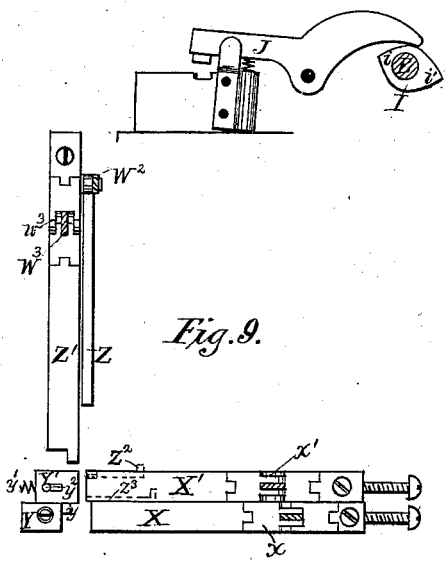
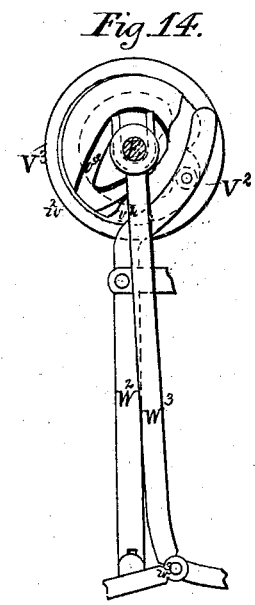
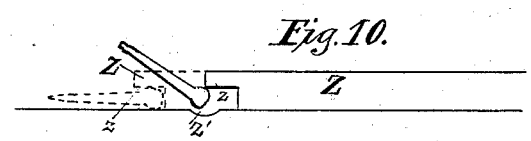

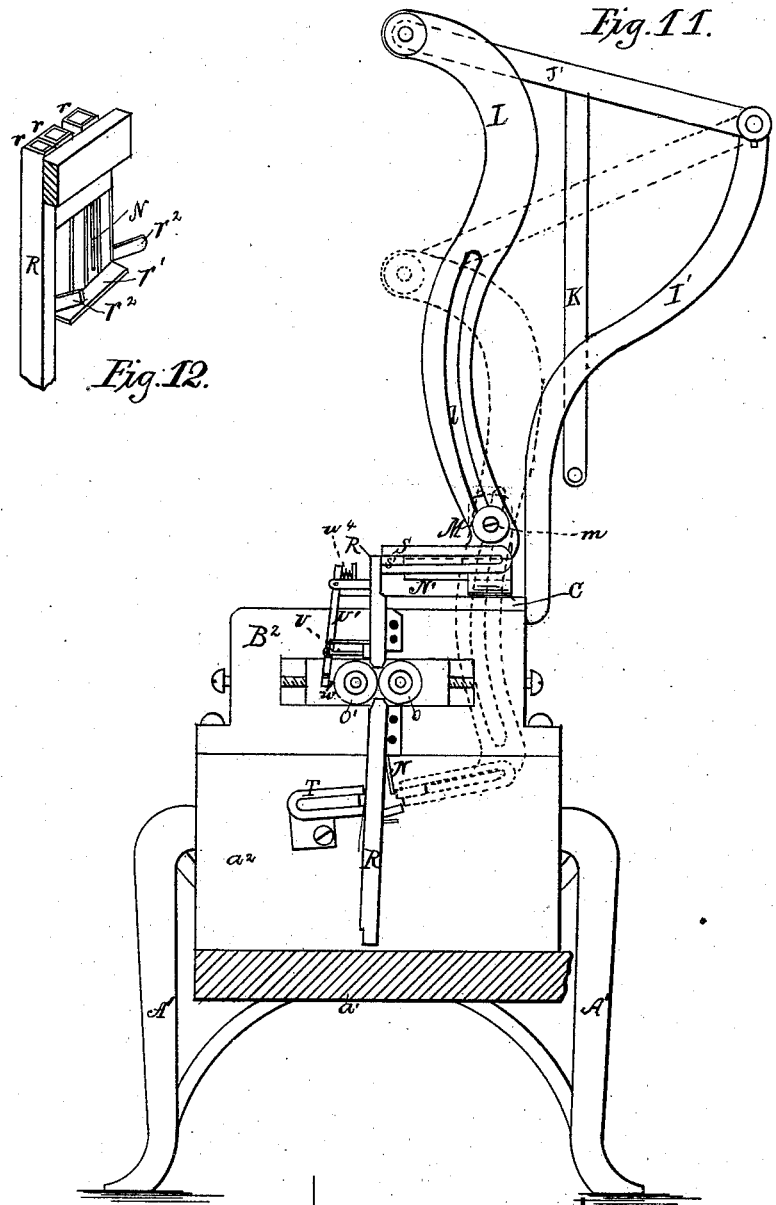

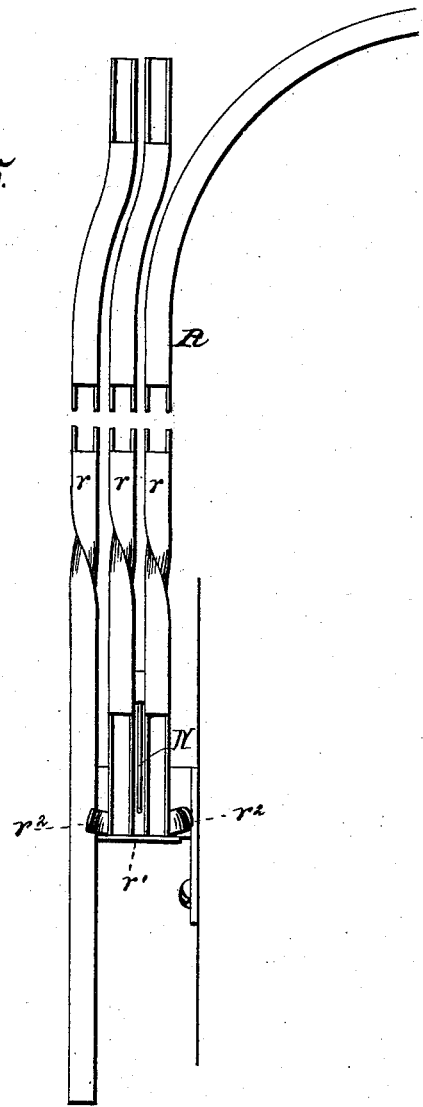

UNITED STATES PATENT OFFICE.

GEORGE J. CAPEWELL, OF CHESHIRE, CONNECTICUT.

IMPROVEMENT IN MACHINES FOR MANUFACTURING HORSESHOE-NAILS.

Specification forming part of Letters Patent No. 217,336, dated July 8, 1879; application filed February 17, 1879.

*To all whom it may concern:*

Be it known that I, GEORGE J. CAPEWELL, of Cheshire, in the county of New Haven and State of Connecticut, have invented certain new and useful Improvements in Machines for Manufacturing Horseshoe-Nails; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to machines for manufacturing nails, and especially to that class of such machines in which blanks severed from a rod are compressed between grooved pressure-rolls.

The nature of said invention consists, chiefly, in certain improvements in the devices for guiding the blanks as the latter are fed to the successive series of impressions in the rolls, and for lifting the blanks from the bottoms of the guide-tubes to the tops thereof.

It also consists in certain improvements in the heading and trimming devices, and in other parts of the machine, all as hereinafter particularly described, and subsequently pointed out in the claims.

In the accompanying drawings like letters indicate like parts.

Figure 1 represents a perspective view of my improved machine for manufacturing nails. Fig. 2 represents a detail view of the cutting and holding device. Fig. 3 represents a partial plan view, showing the devices for actuating the trimming and shaping plungers. Fig. 4 represents, in detail, the cam-grooved wheels used for actuating said plunger. Fig. 5 represents, in sectional detail, the roll-gear and devices for adjusting the rolls to make them register properly. Fig. 6 represents, in detail, the construction of the rolls, showing the cam-grooves in the outer roll. Fig. 7 represents, in vertical section, the devices for regulating the presentation of blanks to one set of impressions in the rolls. Fig. 8 represents a front elevation of a complete set of such regulating devices. Fig. 9 represents a plan view, detached, of the plungers and other devices for finally shaping and trimming the blanks. Fig. 10 represents, in detail, the slide which turns the blanks upon their edges and delivers them to the plungers. Fig. 11 represents an end elevation of my machine, showing the arrangement of my magnets. Figs. 12 and 13 represent detail views of the guides and movable magnets, respectively. Fig. 14 represents, in detail, some of the devices for actuating the plungers. Fig. 15 represents a rear elevation of the guide-tube sections, the rolls being removed.

In said drawings, A designates the bed-plate of the machine, which consists of a higher platform, $a$, at one end, and a lower platform, $a^1$, at the other, the two being connected by a vertical wall, $a^2$. This bed-plate rests on legs or standards $A^1$, and serves as a base for standards $A^2$ and $A^3$ and solid frames B $B^1$ $B^2$ $B^3$, which sustain the operating parts of the machine. C designates a platform or upper bed above platform $a$, supported by frames B $B^1$ $B^2$. This platform C supports solid plates C' C', which have overhanging bearings formed in them for the driving-shaft E of the machine. Said driving-shaft receives motion through any suitable gearing, and is provided with a fly-wheel, D, and gear-wheel E', also with cams for operating the feeding devices which supply the rest of the machine with the bars to be operated on. Said feeding devices consist, chiefly, of a reciprocating properly-guided feeding-carriage, G, and a horizontally and vertically vibrating feeding-lever, H, having anti-friction rollers F on its actuated end.

I, Fig. 2, designates an eccentric carried by driving-shaft E, and provided with peripheral projections $i$ $i'$, the latter being the larger. This eccentric operates the rear end of cutter-bar J, so as to give it a partial stroke, afterward completed. The first movement of said cutter-bar partly severs the bar of metal. It then retains the bar while the carriage G recedes, thus dispensing with a separate holding-lever or other device. The completed stroke severs a length of bar suitable for a blank, which passes on to the pressure-rolls O O'. Of these rolls O is the inner and driver roll and O' the outer one. The office of said rolls is to reduce the severed bars or blanks of metal, and to shape them into the articles desired. Those shown in the drawings are adapted to the production of headed articles, such as horseshoe-nails. Each pair of rollers has several series of registering impressions or grooves, regularly diminishing in size and depth, for effecting this result.

It is found in practice that after a time pressure-rolls will generally wear so that their impressions get out of register. The usual method of remedying this defect has been by making the couplings of the roll-gear in two or more parts, keyed on a connecting-spindle. It is then possible to adjust the rolls by turning one on its axis and refitting the keys—a tedious operation.

The need has been felt for something more simple and expeditious, and this need I meet, as follows: I provide the driving-roll O with a continuous spindle or shaft, P, which extends out of the machine through roll-driving gear-wheel Q, driven by gear E', and is provided at its outer end with an arm, $q$, which is clamped at its outer end to said gear-wheel by a clamp-screw, $p$, and nut, said screw passing through a slot in said wheel. When said clamp-screw is loosened said arm $q$ can be turned, so as to turn said spindle or shaft on its axis, thereby adjusting said roll so as to make its impressions or grooves register with those of the other roll. The said arm is then clamped again in its new position.

R designates the tubular guideway which I employ for conducting the blanks to and from the rolls. This guideway consists of a series of separate parallel tubes or sections, $r\ r$, the first of which is provided with a curved upward extension for receiving the blanks from the cutting and feeding devices, and the last one of which tubes or sections is provided with a straight downward extension for delivering the blanks to a slide which feeds the trimming and heading devices. The said tubes are twisted in shape, so as to insure a partial turning of said blanks before each act of compression by the rolls, so that all sides of the blanks will be uniformly treated. The said tubes $r\ r$ are bent near their upper ends in such manner that the lower end of each tube or section $r$ is vertically below the upper end of the next succeeding tube.

S designates a movable permanent magnet, whose office is to pick up the blanks at the bottoms of the sections or tubes $r\ r$ and drop said blanks into the successive upper ends of said sections.

I' designates a pair of standards, supported by the upper platform of the main frame of the machine, and occupying a position slightly inclined from the vertical. To the upper ends of these standards are pivoted the rear ends of tilting frame J', which rocks up and down thereon. This motion is received by said frame from the main gearing of the machine through connecting-rod K, and is transferred to a cam-slotted bar, L, which carries said magnet S. The cam-slot $l$ in said bar receives a fixed stud or wrist-pin, $m$, on an upright standard or plate, M, fixed to the frame of the machine. The said stud and cam-slot together guide the upward and downward movement of the said magnet S, so that the latter is moved inward toward guideway R at the upper and lower ends of its journey.

T designates a fixed permanent magnet, arranged at the front of the bottom of the guideway R, opposite the magnet S when at its lowest position. The lower ends of the lengths $r$ are open at the rear to allow access of movable magnet S, and are provided with a bottom plate, $r^1$, to prevent the escape of the blanks downward, with flaring guide-plates $r^2$ to direct the inward movement of the magnet S, and with a spring or spring-bar, N, extending down between said tube and said movable magnet. N' designates a fixed horizontal spring-plate, attached to standard M, and extending toward the tops of guide-tubes $r\ r$, collectively constituting the guideway R, for supplying blanks to the pressure-rolls and conducting blanks therefrom. $S^1$ designates a block of truncated wedge form, arranged within the front of said movable horseshoe-magnet S and between the poles thereof, so that its rear corners extend outwardly from the sides of said magnet S like horns. This block is guided and braced by a long pin, $S^2$, running back through said magnet. Its construction is clearly shown in Fig. 13. Its arrangement is such that spring-plate N' will be pressed back laterally by its inclined side as it goes forward, and inward at the upper end of said movable magnet's journey, but will spring behind the corner of said block, and as the magnet withdraws to descend will thrust said block forward, disengaging the blanks from the magnet S, and permitting them to fall into the respective lengths of tube forming the guideway R. The said block $S^1$ protrudes during its descent; but when thrust in toward the guideway R again at the lower end of its journey it is forced back within said movable magnet S by the slight resistance of spring N. This spring N yields to the pressure of the magnet, and does not prevent in any way its contact with the blanks.

Each bar or blank of metal coming from the feeding and cutting devices will pass downward to, through, and from the pressure-rolls partly by the effect of gravity and partly by the impulse communicated by the feeding carriage and rolls. In passing through said rolls it receives the imprint of the first pair of impressions therein. On reaching the lower end of the first tube or length of tube $r$ it rests on bottom plate $r^1$, and is retained in its upright position by the attraction of fixed permanent magnet T. Movable magnet S, being more powerful than fixed magnet T, then approaches, picks it up, and carries it to the top of the guideway, where it is deposited in the next length of tube $r$, as hereinbefore described. The procedure is repeated at each length of tube until the last is reached. The blank passes down through and out of this by the attraction of gravity to the final trimming and shaping devices, hereinafter described. Of course in practical operation several blanks are lifted and dropped simultaneously by the magnet, the blank from the first tube-length $r$ being lifted to the top of the second tube-length, while that from the second is lifted to the top of the third, and so on.

The shapes, arrangement, and methods of attachment of these parts may, of course, be considerably varied. The block in the movable magnet may, for instance, have but one outwardly-extending corner, or more than one guide pin or rod; also, the relative arrangement of the guiding slot and stud may be reversed.

In Fig. 11 the upper and lower positions of the magnet-carrying devices are indicated respectively by solid lines and dotted lines.

Instead of the permanent magnet S, I may employ a temporary magnet, arranged to be demagnetized on reaching the upper end of the guideway R. When this is done the sliding block in the magnet and the fixed springs engaging therewith may be omitted. The magnetizing electric current may be produced by a galvanic battery, friction devices worked by the main shaft of the machine, or by any other suitable expedient.

Instead of a magnet, I may employ any device or devices which will grasp, raise, and drop the blanks, so as to effect the desired object. The most convenient of such contrivances is a set of spring-jaws arranged to journey like the magnet, to close automatically on the blanks at the lower end of their course, and to open automatically at the upper end thereof, to deposit said blanks in said guideway R. There will be one pair of jaws for each length $r$ of tube except the last. A fixed wedge is a convenient means for automatically opening them. Inward inclines in the inner faces of the jaws allow the entrance of the blanks. Springs hold the jaws together on said blanks after such entrance; but I prefer the permanent magnets, hereinbefore described.

It is found necessary to provide means for insuring that the blanks shall be delivered to the pressure-rolls only when the latter are in proper position to receive them; otherwise there will be great danger that the heads of the blanks will be caught between the shallower parts of the impressions in the rolls and pressed out of proper shape. To prevent this, I employ a series of gates or slides, U, one for each tube-section $r$ above the rolls, working in and out through openings $u$ in the front of said tubes and between flaring side guides, $u^3$, on the outside of said openings. Each gate U is operated by a pendent lever, U', provided at its lower end with a projection, $u^1$, which engages with a cam-groove, $u^5$, in the outer roll, O'. Above the pivot of said lever is a spring, $u^4$, working in opposition to the cam of said roll O'. The effect is to allow the blanks to fall one by one just at the right moment to insure their proper reception and treatment by the pressure-rolls. There are as many cam-grooves in the outer roll, O', as there are tube-sections and gates; and they are arranged so as to alternate with the shaping grooves or impressions. These regulating devices may be modified in various ways, provided the principle of operation is preserved.

The driving-shaft of the machine carries wheels or disks V V¹ V² V³, having cam-groves $v$ $v^1$ $v^2$ $v^3$ in their sides, as shown in Fig. 4. These cam-grooves receive wrist-pins, whereby said wheels operate, respectively, upright levers W W¹ W² W³. Levers W W¹ are operated through working-beams $w$ $w^1$, pivoted on shaft W⁵, which is journaled on bearings supported by standards A² A³. The vertical motion of these levers W W¹ is transferred (as horizontal longitudinal reciprocation) through toggles $x$ $x'$ to trimming-plunger X and griping plunger X'. These plungers are arranged side by side parallel to the front of the machine, trimming-plunger X being the outer one. Opposite to said trimming-plunger is a fixed punch, Y, provided with a trimming-blade, $y$; and opposite to said griping-plunger is a sliding block, Y', pressed toward said griping-plunger by a spring, $y^1$, and guided by pin and slot $y^2$, or some equivalent device. Disk V² rocks lever W² (of the first kind) horizontally, which lever is pivoted in suitable bearings, and transmits longitudinal horizontal motion to a delivery-slide, Z, that operates at right angles to said plungers X X'.

This delivery-slide is recessed on the under side of its working end $z$, as shown. When withdrawn to its rearmost position the working end of this slide is just behind the lower end of final guide-tube section $r$, and it works backward and forward in a guideway which extends in the bed-plate of the machine to the trimming and heading devices. This guideway is made so narrow that it will keep a nail from turning on its side after it has been laid on edge therein. Said guideway may have a slight enlargement under said final tube $r$, to insure the reception of each blank which drops from the latter, and in the bottom of said guideway, under said tube, a slight concavity, $z^1$, is formed, which receives the head of each blank as it drops head foremost from said tube-section.

The operation of turning the blank on its edge is as follows: The slide Z moves forward and the projecting upper part of its end $z$ presses horizontally against the upper part of said blank near the imperfect point of the latter. The lower part of the working end of slide Z being removed, there is no pressure against the lower part of said blank. The concavity $z^1$ offers a fulcrum for the head, and at the same time insures sufficient resistance to prevent the blank from being moved forward bodily until its position is horizontal. As a result the blank is simply turned into a horizontal position on its edge, and is then fed forward by the lower part of the working end of said slide to the griping, trimming, and heading devices, hereinafter described.

The projecting upper part of the recessed working end of said slide extends over a considerable part of the blank during this last movement, and prevents the blank from rising in the least out of its horizontal position on edge suitable for trimming. This slide being located immediately below the lower end of final guide-tube section $r$, prevents any blank from leaving said final guide-tube section until the said slide has withdrawn to its rearmost position.

Lever $W^3$, operated by said disk $V^3$, having cam-groove $v^3$, has its upper end bifurcated at $w^2$, to avoid locking against the working-shaft of the machine. Its vertical motion is transmitted through toggle $w^3$, as horizontal reciprocatory motion, to a heading-plunger, $Z'$, which works parallel to slide Z. Both it and the griping-plunger $X'$ are suitably recessed at their working ends to give the heads of the nails or other articles the proper shape.

The characters $z^2$ $z^3$ designate two clearers, which have their bent rear ends fixed in recesses of the bed-plate, and which sit loosely into longitudinal grooves in the sides of the working end of said griping-plunger, so that said clearers remain stationary while said griping-plunger moves backward and forward. When said griping-plunger moves forward for griping it passes beyond the front ends of said clearers; but as it withdraws they, extending beyond its front end, dislodge the blank, so as to prevent it from adhering to the griping-plunger. Similar adhesion of the blanks to block $Y'$ is prevented by the jarring action of spring $y^1$ when released from pressure. These plungers X $X'$ and $Z'$ and slide Z are provided with suitable guides, and they, as well as the parts Y and $Y'$, are held detachably, but firmly, in their places by removable blocks and clamping-screws or other suitable devices.

The action of said final trimming and shaping devices is as follows: The blank drops head foremost from the discharge end of the guideway R immediately in front of the delivery-slide Z. Said slide then moves forward and turns the blank on its edge, as hereinbefore stated, and feeds it point foremost to griping-plunger $X'$. The latter then moves forward, pressing back block $Y'$ against the resistance of spring $y^1$, while trimming-plunger X forces the pointed end of the blank against fixed trimming-blade $y$. The working end of said trimming-plunger is recessed to allow the more perfect working of said trimming-blade. The heading-plunger $Z'$ is then advanced against the head of the blank, so as to give it shape, the said blank being meanwhile held by griping-plunger $X'$ and block $Y'$. The plungers are then withdrawn and the blank freed, as above stated, and the feeding forward of the next blank follows. The blanks drop successively from these plungers through an opening in the bed-plate into any suitable receptacle.

The above-described trimming and shaping devices and delivery-slide may be operated by any suitable means other than the system of levers, toggles, &c., hereinbefore described.

Furthermore, the trimming-blade or punch may be carried by the trimming-plunger instead of being stationary, as shown, the die or block being held by the bed-plate.

Having thus fully described my invention, what I claim as new, and desire to secure by Letters Patent, is—

1. In combination with pressure-rolls and a tubular sectional guideway, a movable magnet and suitable mechanism which causes said magnet to pick up the blanks at the discharge ends of said guide-tube sections, carry them to the receiving-ends of the next guide-tube sections, and deposit them therein, substantially as described.

2. In combination with a movable magnet and a helical guideway, the curve-slotted lever L, rocking bar $J'$, and the guide-stud, which engages with said slotted lever and governs its motion, compelling the movable magnet to approach the guideway-sections at the top and bottom thereof, substantially as described.

3. In combination with a helical sectional guideway, a movable magnet, which picks up the blanks at the bottoms of the guideway sections and delivers them at the tops thereof, and suitable mechanism for operating said magnet, a sliding block arranged within said magnet and extending laterally outward therefrom, a fixed spring, which forces said block to protrude at the top of the guideway, for freeing the blanks, and another spring, which replaces said block at the bottom of the guideway, substantially as described.

4. In combination with a helical sectional guideway, a movable magnet, which picks up the blanks at the bottoms of the guideway-sections and delivers them at the tops thereof, and suitable mechanism for operating said magnet, and a fixed magnet, which holds said blanks in a vertical position at the bottom of said guideway until the movable magnet picks up the said blanks, substantially as described.

5. In combination with head-pressing and trimming plungers and suitable griping devices, a delivery-slide, recessed at $z$, and a bed-plate having a concavity, $z^1$, for the reception of the head of the blank during the operation of turning the latter on its edge, substantially as described.

In testimony that I claim the foregoing as my own I affix my signature in presence of two witnesses.

GEORGE J. CAPEWELL.

Witnesses:
EDWARD A. CORNWALL,
CORNELIA A. CORNWALL.